United States Patent [19]

Daly, III

[11] Patent Number: 5,342,650
[45] Date of Patent: Aug. 30, 1994

[54] HEAT RESISTANT SILICATE COATED FABRICS FOR INSULATING DRIVER AGAINST HIGH HEAT SOURCES

[75] Inventor: Howard J. Daly, III, Pewaukee, Wis.

[73] Assignee: D & H Heat Technology, Olmsted Falls, Ohio

[21] Appl. No.: 978,821

[22] Filed: Nov. 19, 1992

[51] Int. Cl.$^5$ .............................................. B05D 3/12
[52] U.S. Cl. .................... 427/178; 427/370; 427/387; 427/397.7
[58] Field of Search ............... 427/203, 204, 370, 387, 427/389.8, 397.7, 178; 428/377, 391, 429

[56] References Cited

U.S. PATENT DOCUMENTS

| | | | |
|---|---|---|---|
| 2,684,349 | 7/1954 | Whelton | 260/37 |
| 4,316,930 | 2/1982 | Stengle, Jr. | 427/387 |
| 4,496,469 | 1/1985 | Morimoto et al. | 427/387 |
| 4,618,522 | 10/1986 | Modic | 427/387 |

*Primary Examiner*—Shrive Beck
*Assistant Examiner*—Erma Cameron

[57] ABSTRACT

A non-compressed heat insulation barrier fabric composite comprising a layer coating of polysiloxane and silicate applied to a textured woven fabric under heat and pressure in a multi-step process to produce a decompressed composite. The fabric composite is produced by coating the woven fabric with the polysiloxane silicate coating and partially curing under heat and pressure to produce a partially cured. composite, whereupon the curing process is interrupted and the partially cured composite is decompressed to loosen the fibers, followed by complete curing of the composite under heat without significant pressure to produce a non-compressed heat insulation barrier fabric composite.

8 Claims, No Drawings

HEAT RESISTANT SILICATE COATED FABRICS FOR INSULATING DRIVER AGAINST HIGH HEAT SOURCES

The invention relates to heat resistant fabric insulating materials and more particularly to flexible composite heat and wear-resistant fabric manufactured by a multi-step laminating and forming process to produce a decompressed heat barrier fabric composite for lining driving compartments of racing cars.

BACKGROUND OF THE INVENTION

In recent years, many technology advances have been introduced to substantially increase the horsepower and speed output of race car engines which generate abnormally high amounts of heat in the engine compartments. Attempts have been made to control the tremendous amounts of engine heat generated by wrapping engine parts or engine compartments with thermal barriers. However, most of the heat can be traced to header pipes extending out of the engine block, and hence, most prior heat barrier products pertain to fabric wraps around the header pipes to prevent excessive heat from attacking and deteriorating other components within the engine compartment. Such attempts to control excessive heat from the header pipes simply contained excessive heat within the exhaust system and transferred the heat down the exhaust pipeline. For instance, U.S. Pat. No. 5,134,846 suggests an insulating exhaust cover of glass fiber or carbon fiber and an outer flexible metal sleeve to wrap the exhaust system to maintain exhaust gases hot to increase exit velocity and reduce exhaust back pressure in the exhaust system. As the exhaust pipes heat up, however, excessive heat is generated within the driving compartment or cab where the driver of the race is located. Hence, excessive heat generated by powerful race car engines overheat the driving compartments causing most drivers to wear cooling equipment for protection against the excessive heat and to avoid fatigue and heat exhaustion.

Prior art heat-resistant fabrics have been suggested in U.S. Pat. No. 4,246,313 directed to woven fabrics coated with organic-inorganic silicone resin containing heat-resistant particulate material. Organopolysiloxane coated fabric substrates are suggested in U.S. Pat. Nos. 4,666,765, 4,587,159, and 4,489,127. The prior art, however, does not suggest the decompressed polysiloxane-coated fabric composite of this invention particularly adapted to insulate the driving compartment of racing cars against excessive heat generated by race car engines. The present invention comprises a composite fabric laminate of heat-resistant fabric and cured silicone resin formed in a multi-step forming process to minimize or eliminate undesirable fabric compression which has been found to reduce insulating properties of the composite fabric.

Accordingly, the flexible non-compressed composite heat-resistant fabric of this invention is particularly suitable for lining the interior or exterior walls of the driving compartment of a racing car to provide a thermal barrier and prevent excessive engine heat from entering the driving compartment and adversely affecting the driver.

SUMMARY OF THE INVENTION

Briefly, the heat-resistant, insulating fabric comprises a tightly woven flexible fabric of inorganic fiber coated with a thin silicate layer containing silica powder and polysiloxane polymer heat cured under and heat to form a composite sheet of decompressed barrier fabric. In accordance with the process of invention, the silicone polymer is cured in a two-step process where silicone polymer is first partially cured to produce a partially cured fabric composite which is then removed from the curing means and decompressed to eliminate compression of the fabric fibers, whereupon the decompressed fabric is again heat cured without pressure to complete the curing cycle to produce the decompressed composite thermal barrier fabric of this invention containing non-compressed interwoven fiber structure.

DETAILED DESCRIPTION OF THE INVENTION

The decompressed composite heat barrier insulating fabric of this invention comprises a multi-layer she fabric composite of heat-resistant inorganic fabric combined with silicate particles and polysilicone resin and heat cured in accordance with this invention.

The woven fabric preferably comprises heat-resistant inorganic woven fiber yarns such as fiberglass, ceramic fibers, carbon fibers as well as minor amounts of polyaramid fibers, phenolic fibers, polyester fibers, nylon fibers, polyacrylonitrile fibers, cotton and fibers, if desired. Preferred woven fabrics comprise the heat-resistant fiberglass, ceramic fiber or carbon fibers, or mixtures thereof, or predominately such inorganic heat-resistant fibers with minor amounts of the other fibers. Typical fiber blends are carbon/polyaramid fibers, glass/polaramid fibers, glass/carbon fibers, and carbon/glass/aramid fibers. Preferably, the woven fabric contains fiberglass, ceramic, and/or carbon fibers capable of being heat resistant against temperature; in excess of 1000 degrees F. A particularly useful commercial glass fiber containing fabric material is sold under the tradename Zetex and manufactured by Newtex Industries, Inc. Another useful glass fiber fabric is known as Zetex Plus consisting of glass fiber treated with vermiculite as described in U.S. Pat. No. 4,608,303, and also sold by Newtex Industries, Inc. Typical fiber structure comprises large number of fiber filaments gathered into strands where the strands are interwoven to from a woven fabric. Preferred woven fabrics are bi-directional at approximately right angles although multi-directional woven fabrics are useful but more costly. Useful woven fabrics have a fabric thickness of about 1/16 to ¼ inch thickness or larger thickness, if desired. The fabric yarns can be treated or untreated but preferably are treated within an aqueous hydrochloric acid bath. The woven fabric is preferably texturized to provide a texturized non-smooth surface to increase thermo-resistance. The textured non-smooth surface is maintained during the process to produce the decompressed woven fabric composite heat insulation barrier.

In accordance with this invention, the heat-resistant woven fabric is coated with a layer of silicate particles such as sand, silicate powder, silicate compound powder, or ground glass powder. Preferably the woven fabric surface is first coated with an organic adhesive to seal the fabric surface and provide a sticky surface for distributing the silicate particles uniformly on the woven fabric surface to provide a uniform layer of silicate particles on the woven fabric. The silicate powder covered woven fabric is then covered uniformly with a thermo-setting polysiloxane resin layer to form an uncured fabric composite. Alternatively, the polysiloxane resin is uniformly intermixed with the silicate powder particles and applied to the woven fabric as a paste consistency mixture adapted to flow out under heat and pressure. The weight ratio of polysiloxane resin to silicate powder applied to the woven fabric is broadly between about 15% and 85%, and preferably between about 35% and 65% by weight polysiloxane resin based on the weight the resin plus silicate powder on a square foot basis; the heat-resistance fabric of this invention typically comprises the woven fabric coated with a layer thickness desirably greater than 0.03 inch thickness and preferably between 0.04 and 0.1 inch layer mixture of silicate powder and polysiloxane resin. The polysilicone preferably comprises a thermosetting methphenyl silicone such as dimethylpolysiloxane polymer adapted to be heat cured at temperatures above 250° F.

In accordance with the process of this invention, the woven fabric is preferably dried under moderate heat and first coated with a layer of silicate particles followed by a layer of polysiloxane polymer, or alternatively the dried woven fabric is coated with a mixture of silicate powder and polysiloxane resin, to form an uncured composite. The uncured composite is then cured under heat in a two-step curing process. In the first step, the uncured composite is cured within a heat curing means under heat and pressure to form a partially cured composite. The partially cured composite is then removed from the heat curing means and decompressed to loosen the woven fabric fibers and particularly to eliminate compression of the fabric fibers. Fiber compression due to heat and pressure curing was found to diminish the cured fabric composite insulating properties. Decompression can be advantageously achieved by rolling the partially cured composite into a coil and then subsequently uncoiled for heating the partially cured composite in the second curing step to completely cure the fabric composite in the heating means but without pressure.

Heat curing in the first partial curing step should be above about 40° C. for a time sufficient to partially cure the woven fabric composite to about 35% to 65% of complete cure where a partial cure is preferred. A percentage partial cure can be estimated by the percent time taken to cure a comparable composite to 100% cure at a given temperature and pressure. Pressure applied in the first step partial curing should be above about 10 psi and sufficient to cause the heated polysiloxane resin to flow into and penetrate the surface of the woven fabric. In the second curing step, the curing temperature should be above about 50° C. for a time sufficient to obtain a complete cure. The second curing step follows the decompression step and should be without significant pressure to avoid compressing the fabric. After curing, the insulating fabric sheets can be trimmed to width and length, if desired, and rolled into coils for shipment.

The resulting completely cured woven fabric composite is particularly useful as a heat insulation barrier having fire-barrier properties as well.

A particularly preferred use of the heat insulating composite fabric is to line the driving compartment of a racing car by mounting fabric pieces to the interior and/or exterior surfaces of the compartment and particularly on the forward firewall and the lower floor sections. Multiple layers of the heat insulating fabric can be used to wrap various engine parts and other overheated parts of the racing car if desired. The heat insulating fabric composite can be folded or bent and cut to form the desired contour whereby the formed insulating fabric composite can be glued together in overlap areas and/or to the insulated substrate with a thermo-setting silicone rubber adhesive. Particularly useful silicone rubber adhesives can be radical curing organoperoxide initiated addition curing-type silicone rubber. The overlapped area of the fabric composite can be preformed by hot pressing to form an adhesive secured preformed shape. The resulting preform provides a silicone coated fabric preform which can be similarly securely bound to a substrate to form an accurate, watertight and airtight fabric composite barrier.

The merits of the invention will become more apparent from the following illustrative example.

EXAMPLE

A woven fabric of about 24 inches by 50 inches consisting of fiberglass woven fabric was texturized to provide a pebbled textured, non-smooth surface. The fiberglass woven fabric was dried at about 70° C., until ready for use. While still heated, the fiberglass woven fabric was coated with an adhesive. Seperately, a uniform mixture of dimethylpolsiloxane polymer (Dow-Corning-MX-6020) was mixed with silicate powder particles to provide a paste consistency mixture containing by weight about 50% dimethylpolysiloxane resin. The paste consistency mixture was applied to the adhesive coated side of the fiberglass woven fabric at a thickness of about 0.05 inches to provide a rather uniform 0.05 inch thick coated layer. The coated fiberglass woven fabric was partially cured in a heated press to about 50% of a full cure at about 350° F. for about 30 minutes and under sufficient pressure for the polymeric mixture to penetrate the fabric surface. Thereafter, the partially cured fabric composite was removed from the heating press and decompressed by rolling into a coil and left set at room temperature for about 20 minutes. The partially cured fabric composite was uncoiled and returned to the heated press for complete curing at 380° F., but without significant applied pressure. The fully cured fabric composite was then removed, trimmed, back-rolled into a coil, and stored for use as a heat insulating fabric composite. The heat insulating fabric composite was tested as a heat insulation barrier in a driving compartment of a racing car and found to be very effective as a heat insulation barrier against abnormally high heat.

Although preferred embodiments of the invention have been described specifically the scope of the invention is not intended to be limited thereby except by the appended claims.

What is claimed is:

1. A process for forming a heat insulation barrier fabric composite, the process steps comprising:
   supplying inorganic fibers woven together to form a fabric sheet;
   applying a silicate coating layer to the woven fabric, where the silicate coating layer comprises a silicate powder and polysiloxane polymer and contains on a weight basis between about 15% and 85% of said polysiloxane polymer;
   partially heat curing the applied silicate coating layer at temperatures for time sufficient and with pressure sufficient that the applied silicate coating penetrates the surface of the woven fabric to provide a partially cured composite of woven fabric and partially cured silicate coating;

decompressing the partially cured composite to loosen the woven fabric fibers and substantially eliminate compression of the fabric fibers;

heat curing the partially cured woven fabric composite at temperatures for time sufficient to completely cure the woven fabric composite and provide a non-compressed heat insulating barrier fabric composite.

2. A process for forming a heat insulation barrier fabric composite, the process steps comprising:

supplying inorganic fibers woven together to form a fabric sheet;

applying a silicate coating layer to the woven fabric, where the silicate coating layer comprises a silicate powder and polysiloxane polymer and contains on a weight basis between about 15% and 85% of said polysiloxane polymer;

partially heat curing the applied silicate coating layer at temperatures for time sufficient and with pressure sufficient that the applied silicate coating penetrates the surface of the woven fabric to provide a partially cured composite of woven fabric and partially cured silicate coating;

decompressing the partially cured composite to loosen the woven fabric fibers and substantially eliminate compression of the fabric fibers;

heat curing the partially cured woven fabric composite at temperatures for time sufficient to completely cure the woven fabric composite and provide a non-compressed heat insulating barrier fabric composite;

the partially cured woven fabric composite is decompressed in the interruption of the curing process and the partially cured woven fabric is rolled to loosen the fibers.

3. A process for forming a heat insulation barrier fabric composite, the process steps comprising:

supplying inorganic fibers woven together to form a fabric sheet;

applying a silicate coating layer to the woven fabric, where the silicate coating layer comprises a silicate powder and polysiloxane polymer and contains on a weight basis between about 15% and 85% of said polysiloxane polymer;

partially heat curing the applied silicate coating layer at temperatures for time sufficient and with pressure sufficient that the applied silicate coating penetrates the surface of the woven fabric to provide a partially cured composite of woven fabric and partially cured silicate coating;

decompressing the partially cured composite to loosen the woven fabric fibers and substantially eliminate compression of the fabric fibers;

heat curing the partially cured woven fabric composite at temperatures for time sufficient to completely cure the woven fabric composite and provide a non-compressed heat insulating barrier fabric composite;

the partially cured woven fabric composite being rolled into a spiral roll.

4. A process for forming a heat insulation barrier fabric composite, the process steps comprising:

supplying inorganic fibers woven together to form a fabric sheet;

the inorganic woven fabric fibers being selected from fiberglass, carbon fibers, ceramic fibers or mixtures thereof;

applying a silicate coating layer to the woven fabric, where the silicate coating layer comprises a silicate powder and polysiloxane polymer and contains on a weight basis between about 15% and 85% of said polysiloxane polymer;

partially heat curing the applied silicate coating layer at temperatures for time sufficient and with pressure sufficient that the applied silicate coating penetrates the surface of the woven fabric to provide a partially cured composite of woven fabric and partially cured silicate coating;

decompressing the partially cured composite to loosen the woven fabric fibers and substantially eliminate compression of the fabric fibers;

heat curing the partially cured woven fabric composite at temperatures for time sufficient to completely cure the woven fabric composite and provide a non-compressed heat insulating barrier fabric composite.

5. A process for forming a heat insulation barrier fabric composite, the process steps comprising:

supplying inorganic fibers woven together to form a fabric sheet;

applying a silicate coating layer to the woven fabric, where the silicate coating layer comprises a silicate powder and polysiloxane polymer and contains on a weight basis between about 15% and 85% of said polysiloxane polymer;

partially heat curing the applied silicate coating layer at temperatures for time sufficient and with pressure sufficient that the applied silicate coating penetrates the surface of the woven fabric to provide a partially cured composite of woven fabric and partially cured silicate coating;

decompressing the partially cured composite to loosen the woven fabric fibers and substantially eliminate compression of the fabric fibers;

heat curing the partially cured woven fabric composite at temperatures for time sufficient to completely cure the woven fabric composite and provide a non-compressed heat insulating barrier fabric composite;

the woven fabric comprises the inorganic fibers and minor amounts of organic polymer fibers.

6. A process for forming a heat insulation barrier fabric composite, the process steps comprising:

supplying inorganic fibers woven together to form a fabric sheet;

the woven fabric being a textured woven fabric having a non-smooth fabric surface;

applying a silicate coating layer to the woven fabric, where the silicate coating layer comprises a silicate powder and polysiloxane polymer and contains on a weight basis between about 15% and 85% of said polysiloxane polymer;

partially heat curing the applied silicate coating layer at temperatures for time sufficient and with pressure sufficient that the applied silicate coating penetrates the surface of the woven fabric to provide a partially cured composite of woven fabric and partially cured silicate coating;

decompressing the partially cured composite to loosen the woven fabric fibers and substantially eliminate compression of the fabric fibers;

heat curing the partially cured woven fabric composite at temperatures for time sufficient to completely cure the woven fabric composite and provide a non-compressed heat insulating barrier fabric composite.

7. A process for forming a heat insulation barrier fabric composite, the process steps comprising:
supplying inorganic fibers woven together to form a fabric sheet;
applying a silicate coating layer to the woven fabric, where the silicate coating layer comprises a silicate powder and polysiloxane polymer and contains on a weight basis between about 15% and 85% of said polysiloxane polymer;
partially heat curing the applied silicate coating layer at temperatures for time sufficient and with pressure sufficient that the applied silicate coating penetrates the surface of the woven fabric to provide a partially cured composite of woven fabric and partially cured silicate coating;
decompressing the partially cured composite to loosen the woven fabric fibers and substantially eliminate compression of the fabric fibers;
heat curing the partially cured woven fabric composite at temperatures for time sufficient to completely cure the woven fabric composite and provide a non-compressed heat insulating barrier fabric composite;
the heated fabric being maintained heated while coating with the silicate coating.

8. A process for forming a heat insulation barrier fabric composite, the process steps comprising:
supplying inorganic fibers woven together to form a fabric sheet;
applying a silicate coating layer to the woven fabric, where the silicate coating layer comprises a silicate powder and polysiloxane polymer and contains on a weight basis between about 15% and 85% of said polysiloxane polymer;
the polysiloxane polymer comprising dimethylpolsiloxane polymer;
partially heat curing the applied silicate coating layer at temperatures for time sufficient and with pressure sufficient that the applied silicate coating penetrates the surface of the woven fabric to provide a partially cured composite of woven fabric and partially cured silicate coating;
decompressing the partially cured composite to loosen the woven fabric fibers and substantially eliminate compression of the fabric fibers;
heat curing the partially cured woven fabric composite at temperatures for time sufficient to completely cure the woven fabric composite and provide a non-compressed heat insulating barrier fabric composite.

* * * * *